United States Patent [19]

Friedrich et al.

[11] Patent Number: 4,838,075
[45] Date of Patent: Jun. 13, 1989

[54] METHOD AND A FASTENER FOR CLOSING AND SEALING PIPES SUBJECTED TO INTERNAL PRESSURE

[75] Inventors: Pawel Friedrich; Wiesław Płaczek; Leszek Mynarz; Krzysztof Karpinski; Jerzy Gaszewski; Tadeusz Tarasiuk, all of Warsaw, Poland

[73] Assignee: Instytut Chemii Przemyslowej, Warsaw, Poland

[21] Appl. No.: 161,327

[22] Filed: Feb. 18, 1988

Related U.S. Application Data

[63] Continuation of Ser. No. 868,617, May 29, 1986, abandoned.

[30] Foreign Application Priority Data

May 31, 1985 [PL] Poland ................................ 253726
Apr. 4, 1986 [PL] Poland ................................ 258771

[51] Int. Cl.⁴ .................................................. G01M 3/02
[52] U.S. Cl. ............................................. 73/49.8; 138/90
[58] Field of Search .................... 73/49.1, 49.5, 49.8; 138/90

[56] References Cited

U.S. PATENT DOCUMENTS

| 2,873,764 | 2/1959 | Lombard et al. | 73/49.5 |
| 3,434,337 | 3/1969 | Goeke | 73/49.8 |
| 4,197,733 | 4/1980 | Holland et al. | 73/49.1 |
| 4,571,986 | 2/1986 | Fujii et al. | 73/49.1 |

FOREIGN PATENT DOCUMENTS

| 103777 | 3/1984 | European Pat. Off. | 73/49.5 |
| 1514706 | 2/1968 | France . | |
| 734112 | 7/1955 | United Kingdom | 138/90 |

Primary Examiner—Stewart J. Levy
Assistant Examiner—Hezron E. Williams
Attorney, Agent, or Firm—Ladas & Parry

[57] ABSTRACT

Subject of the invention is a method and a fastener for closing and sealing ends of pipes subjected to internal pressure, e.g. of plastics pipes tested on internal pressure in suitable apparatus in which a piece of pipe is filled with water with a temperature of about 150° C., and subsequently increased pressure corresponding to required stresses in the pipe wall is established. The method of fixing the fasteners as well as the fasteners themselves should make possible an easy and simple putting them and reliable fixing on the ends of pipes tested as well as their certain sealing. The method according to the invention is characterized by the fact that the fastener elements are clamped on pipe ends by a hydraulic or a pneumatic force. It is profitable if this force stems from the pressure of medium filling the pipe during a test. Essence of the fastener realizing the method according to invention lies in the fact that there is a non-return valve in the fastener frame serving delivering hydraulic or pneumatic pressure into fastener elements, and inside the frame, there is a movable, ring-bottom shaped element which is affected by the pressure, while this movable element, affecting itself the fixing conic ring and an elastic packing, causes fastening of the fastener on the pipe and pipe sealing.

5 Claims, 10 Drawing Sheets

METHOD AND A FASTENER FOR CLOSING AND SEALING PIPES SUBJECTED TO INTERNAL PRESSURE

This is a continuation of co-pending application Ser. No. 868,617 filed on May 29, 1986 now abandoned.

BACKGROUND OF THE INVENTION

Subject of the invention is a method and a fastener for closing and sealing pipes ends of pipes subjected to internal pressure, for example plastics pipes subjected to internal pressure tests in suitable apparatus in which a pipe segment is filled with water with a temperature of about 150° C. and subsequently an increased pressure corresponding to required stresses in the pipe wall is established.

A pipe closing and sealing method known so far lies in fixing fasteners consisting usually of four main elements, namely: a cover, a clamping ring, a spring conic ring and an elastic packing, on the pipe ends. Compression of the conic ring on the pipe results from screwing the cover with the clamping ring. At the same time, the cover moving relatively to the clamping ring causes tightening the elastic packing on the pipe.

Such a solution is used by all world firms, e.g. Durapipe from Austria, ITP in the Federal Republic of Germany, Cincinetti from the USA and CEAST from Italy.

The crucial weakness of the presented method and fastener is the long-lasting operation of screwing frequently more than ten screws in each of the fasteners as well as missing relationship between the force compressing the fastener on the pipe and the internal pressure of the medium the pipe is filled with. That leads to occurence of additional stresses in the pipe wall disturbing the test run. For that reason pipe ends are often damaged. Moreover, fasteners are characterized by large overall dimensions and excessive weight.

The aim of the invention is elaborating a new pipe closing and sealing method as well as a fastener serving its realization which will cut significantly the duration of operation of placing and fixing fasteners on a pipe and allow to accomodate the clamp force to the pressure magnitude within the medium filling the pipe.

SUMMARY OF THE INVENTION

The pipe closing and sealing method in accordance with the invention, lying in putting fasteners with elastic packing on pipe ends and fixing them on the pipe using a conical ring, is characterized by the fact that elements of the fastener are compressed on pipe ends by the force stemming from pressure, for example pressure of a liquid. It is profitably if this force stems from pressure of the medium forced into the pipe.

On the other hand, the essence of the fastener for closing and sealing pipe ends in accordance with the 1st variation of the invention, which is made of two fasteners: the upper and the lower one, each of them containing two separable parts: a cover and a clamp ring between which a conical ring and an elastic packing are placed, lies in the fact that advantageously a non-return valve for feeding the medium, e.g. a liquid, into the fastener is located in the cover, and inside the clamping ring between the cover and the conical ring, a ring-bottom shaped, pushable element is situated which is affected by the pressure of medium fed into the fastener, at the same time there is an elastic packing between that movable element and the pipe, whereas the cover and the clamping ring are joined preferably by screw joint. The fastener can be equipped with a compensator of pressure of medium fed into its elements. The compensator consisting of a cylinder with a moving piston which is fed on one side of the piston with medium compressing elements of the fastener, while on the other side with medium forced into the interior of the pipe tested. The compensator is attached to the fastener cover on the pipe axis. If necessary, the piston possesses two working faces of different sizes and then the compensator makes possible pressure transmission. It is expedient, especially during long-time high-pressure tests, if a packing with a flat ring membrane-like shape is placed between the cover and the movable element. In another solution, "O"-type packings are placed between clamping ring, movable element, pressure compensator cylinder and cover.

The essence of a fastener in accordance with the 2nd variation of the invention, consisting of a frame, a conic ring and packings, lies in the fact that there is a non-return valve in the fastener frame serving feeding the fastener with medium, e.g. with a liquid, while inside the frame a ring-bottom shaped, pushable element is situated, at the same time in the bottom part of the frame and in the conic ring flange, radial cut-outs are made which are displaced by a constant angle scale with respect to one another, and the width of cut-outs in the frame and in the flange is chosen in such a way that putting a conic ring into the frame is made possible. On the other hand, one of the packings lies between the flat surface of the movable bottom and the front face of an end of a tested pipe, and remaining packings are situated between the outer cylindrical bottom surface and the internal cylindrical frame surface as well as between the internal cylindrical bottom surface and the cylindrical central part of the frame.

The essence of the fastener in accordance with the 3rd variation of the invention, as compared with the 2nd variation, lies in the fact that the conical ring is made of ring segments, and there are no cut-outs in the frame and in the flange of these segments, because the segmental structure of the ring makes it possible to put it into the frame interior.

The conical ring can also be made as a uniform ring or it may possess transverse cross-cuts then giving it elasticity. In case of segment structure of the conic ring, its segments are dilated by an elastic element in form of a slit sleeve, a slit ring with a circular cut or a cylindrical spring. In all three variations, fasteners can possess a draining valve in their lower parts which makes a quick emptying the pipe of the filling medium, after a test is completed, possible.

The pipe closing and sealing method and the fasteners for its realization presented are free of shortcomings and inconveniences of solutions used so far. Mounting of the fasteners on a pipe consists in placing of the fastener on ends of a tested pipe and applying the pressure. This operation lasts at most 20% of the time consumed so far while fixing traditional fasteners. A very significant feature of the invention a full proportionality of the compression force with respect to the test pressure basing on the phenomenon of equalization of the fastener closure pressure and the test pressure, that protects the pipe from occurence of additional, highly unfavourable stresses. Fasteners in accordance with the invention are characterized by much more concise overall dimensions resulting from elimination of screws, and their weight makes up about 50% of the weight of the fastener in use up to the present.

The main advantage of the fastener in accordance with the 2nd variation of the invention is the elimination of the screw joint which has caused difficulties during dismantling the fastener till now. Instead of the previously existing two elements, the cover and the clamping ring, there is only one element in form of a frame which, while possessing a special shape of the lower part, makes it possible to put inside it a conic ring being a clamping element on a pipe end. In this way, manufacturing of the fastener elements has been simplified and made cheaper as well as the operation of fixing and especially of dismounting the fastener have been simplified and shortened, consisting in axial and then in angular shifting the ring relatively to the frame.

On the other hand, the fastener in accordance with the 3rd variation of the invention, having a conical ring made of segments, does not require making cut-offs in ist frame, nor in the ring flange. So it is a still simpler and cheaper version of fasteners hydraulicly closed on ends of tested pipes.

BRIEF DESCRIPTION OF THE DRAWINGS

Fasteners in accordance with the invention have been shown in the picture presenting manufacturing examples.

FIG. 3b is a section on the line A—A of FIG. 3a.

DESCRIPTION OF PREFERRED EMBODIMENT

Figure 1:
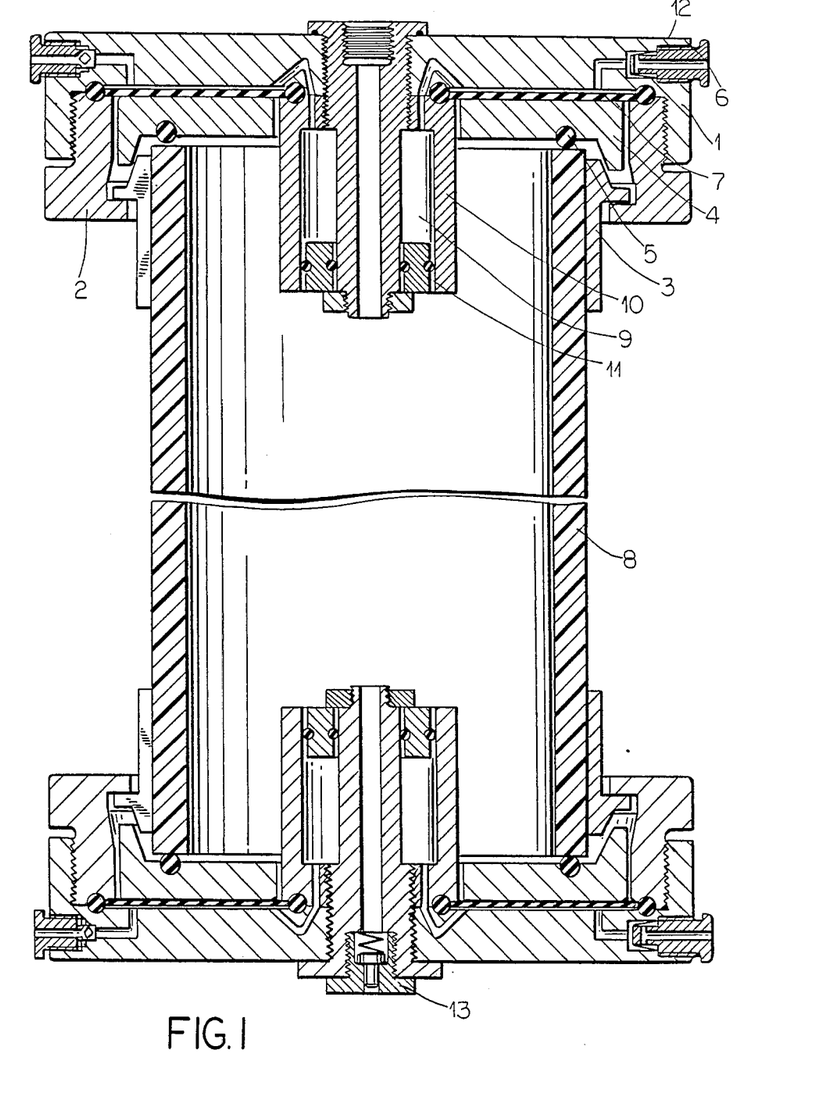
FIG. 1 shows a fastener in the 1st variation fastened on ends of a tested pipe.
Figure 2:
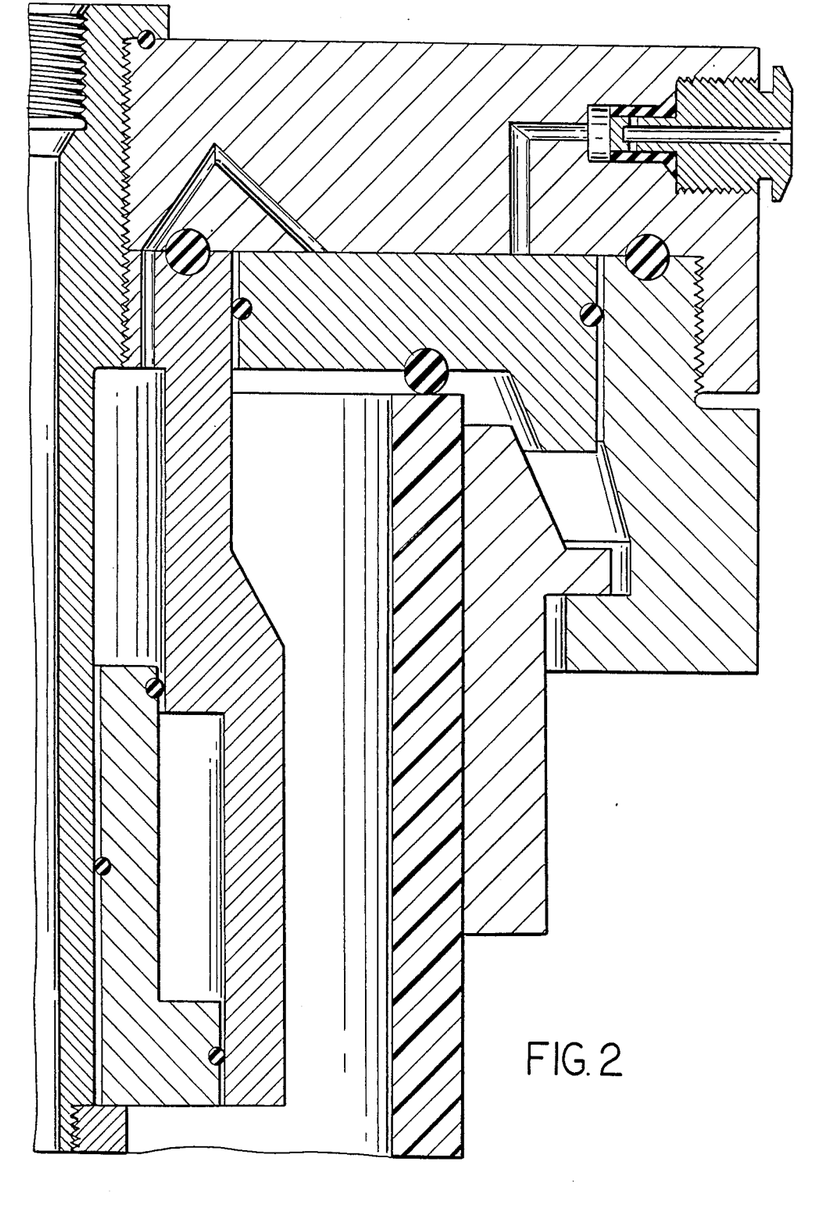
FIG. 2 presents a fragment of the upper fastener with the pressure compensator.
Figure 3A:
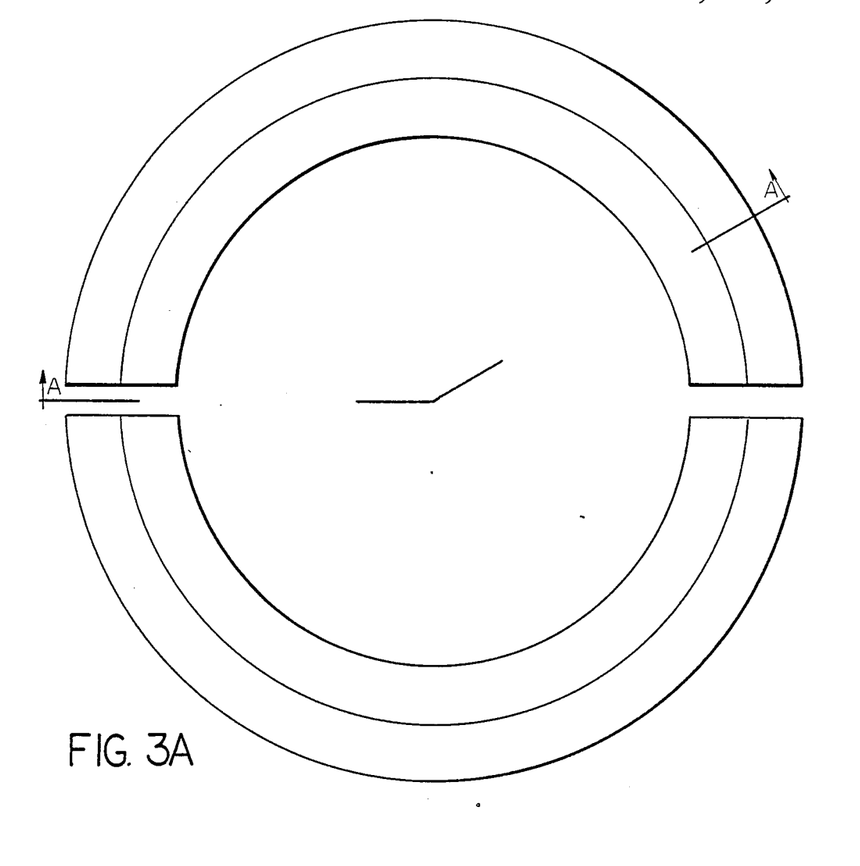
FIG. 3a—shows a top view of a conic ring built of two segments.
Figure 3B:
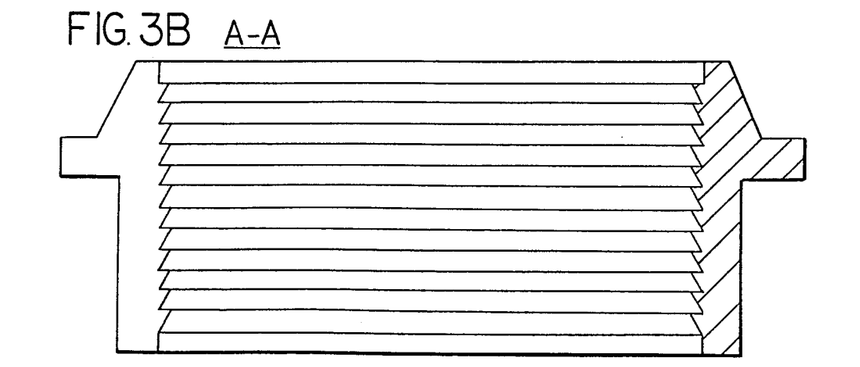
Figure 4:
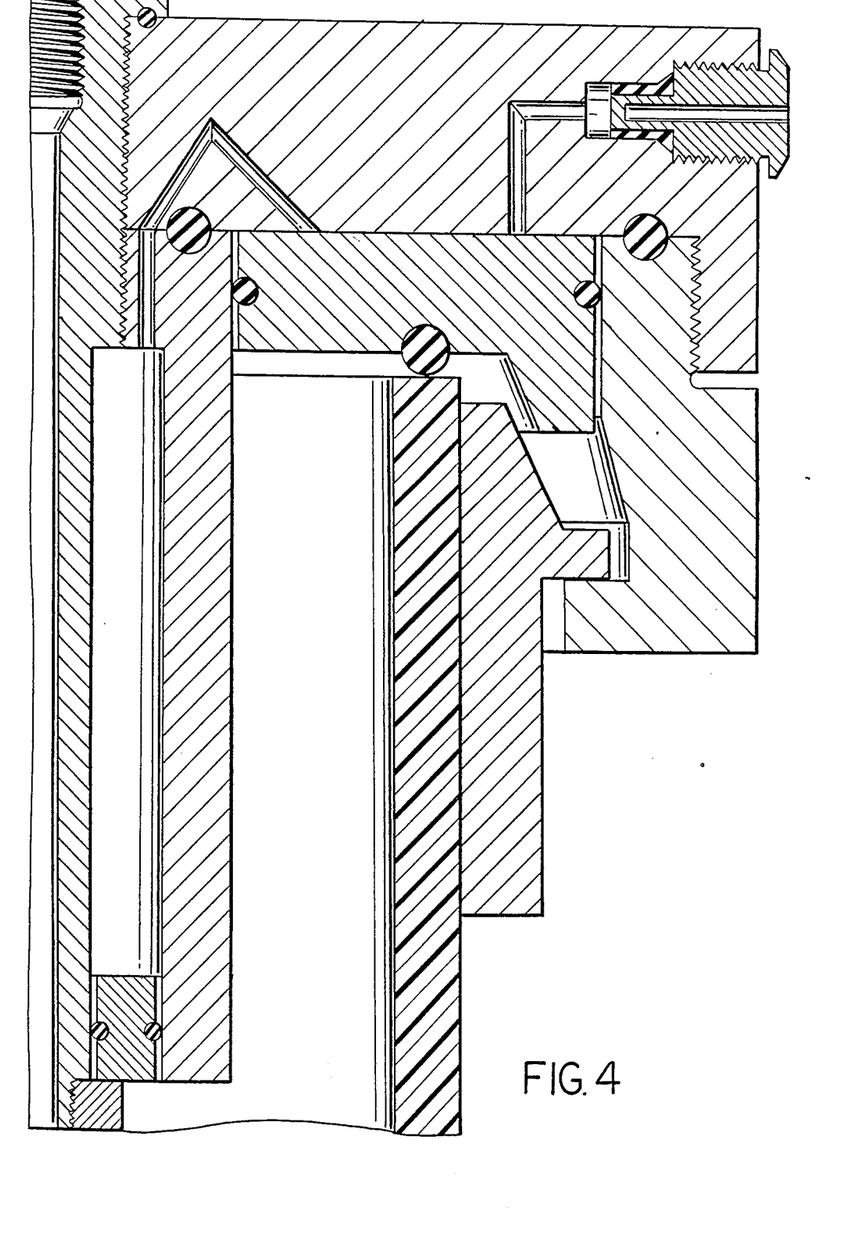
FIG. 4 presents a fragment of the upper fastener with its elements sealed with "O"-type packings.

Each of the two 1st variation fasteners consists of a cover 1, a clamping ring 2, a conical ring 3, a movable element 4 and of an elastic packing 5. Besides, there is a non-return valve 6 in the cover 1, and a membrane 7 is placed between the cover 1 and the movable element 4. The cover 1 is screwed on the clamping ring 2. The movable element 4 is situated pushably inside the clamping ring 2 and has a surface to which the membrane 7 adheres. In the axis line of the plastics pipe 8 to be tested and of each of the two fasteners, a pressure compensator 9 is attached to the cover. The compensator 9 consists of a cylinder 10 and a piston 11. Furthermore, there is an opening 12 in the cover 1 of the upper fastener for feeding water into the pipe 8, and there is a draining valve 13 in the cover of the lower fastener. The piston 11 of the compensator 9 shown in FIG. 1 has two equal working faces, whereas in FIG. 2—two faces have different sizes. The conical ring 3 is second on the pipe 8 as shown in FIG. 1 is a one segment ring with a cross-cut to provide elasticity. In the modification shown in FIG. 3, of the conical ring comprises two half segments.

Figure 5:
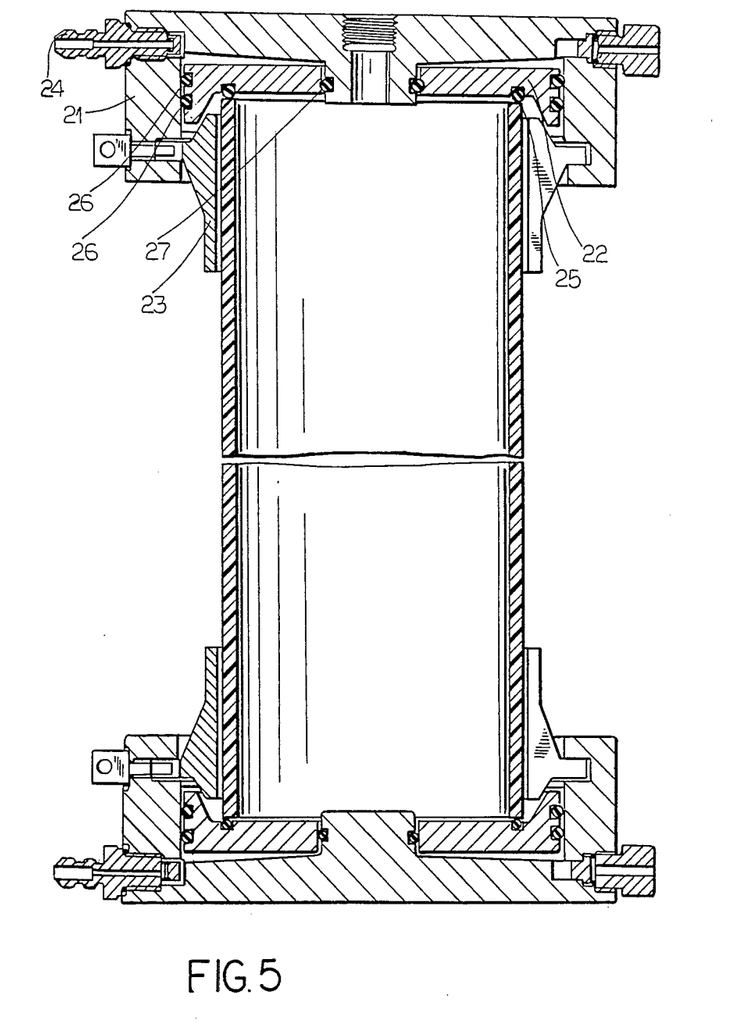
FIG. 5 presents a fastener in the 2nd as well as in the 3rd variation fastened on ends of a tested pipe.
Figure 6:
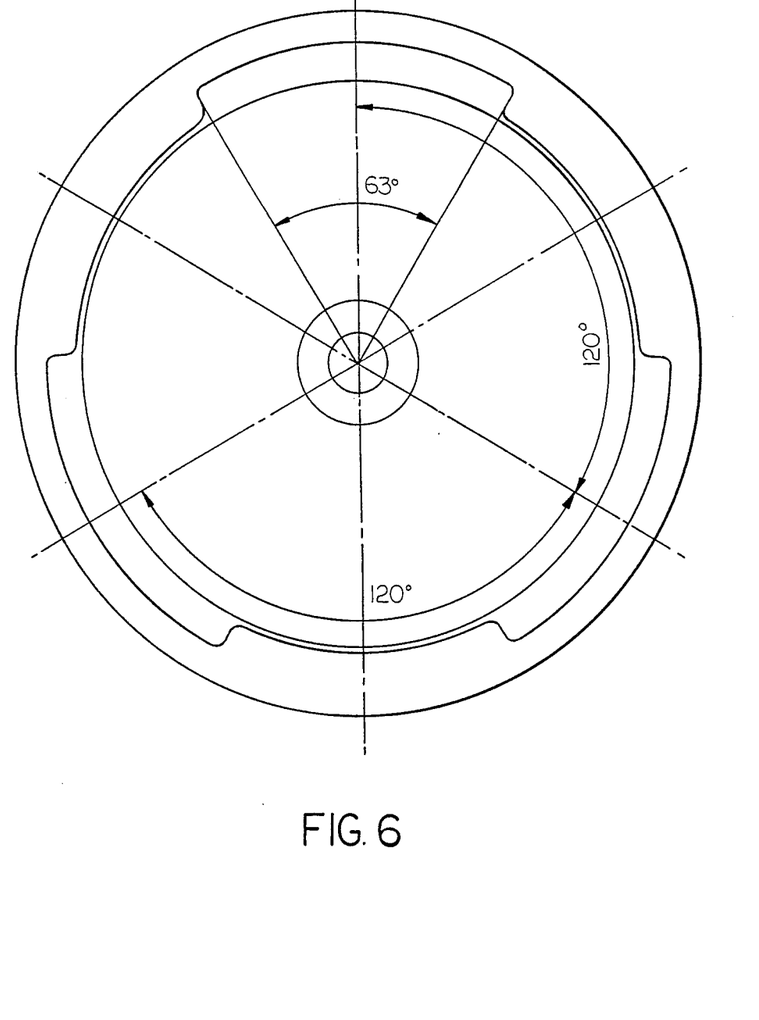
FIG. 6 and FIG. 7 present views of the fastener frame and of the conical ring from the cut-offs side.
Figure 7:
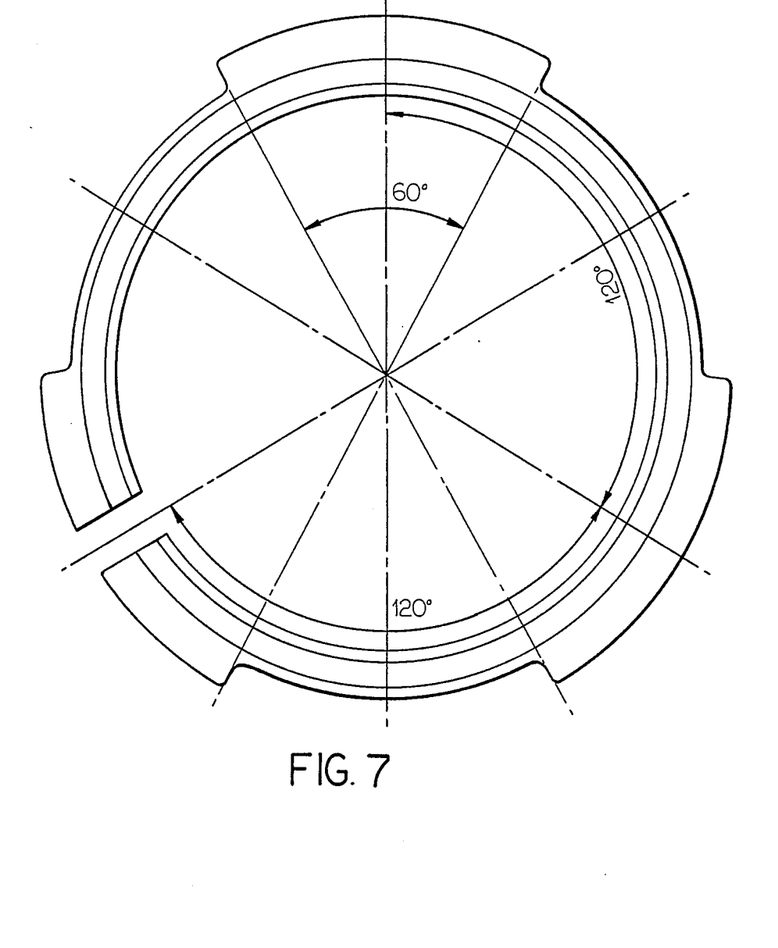
Figure 8:
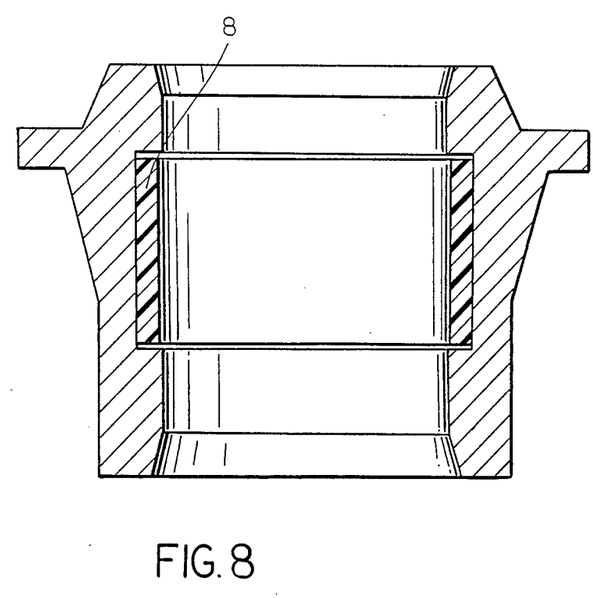
FIGS. 8, 9, 10 present a conical ring with segment structure applied in the 3rd fastener variation.
Figure 9:
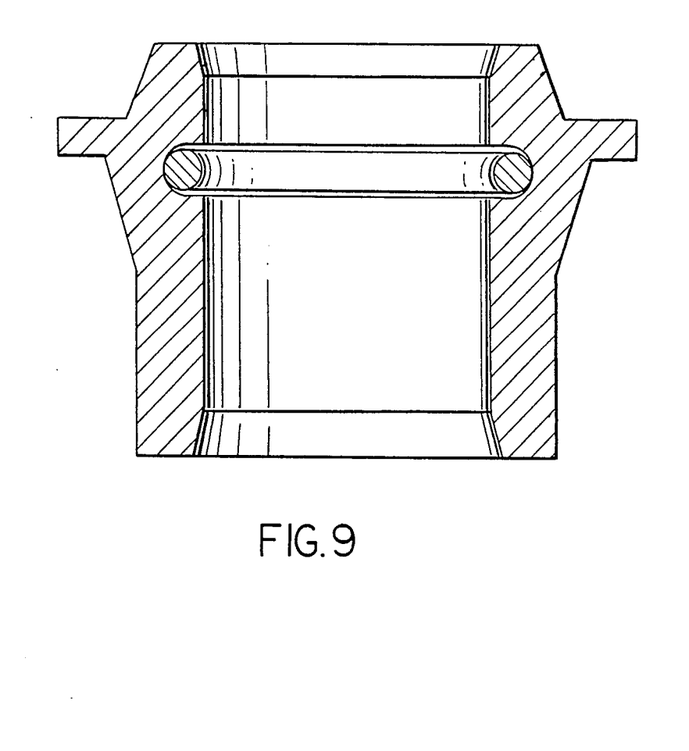
Figure 10:
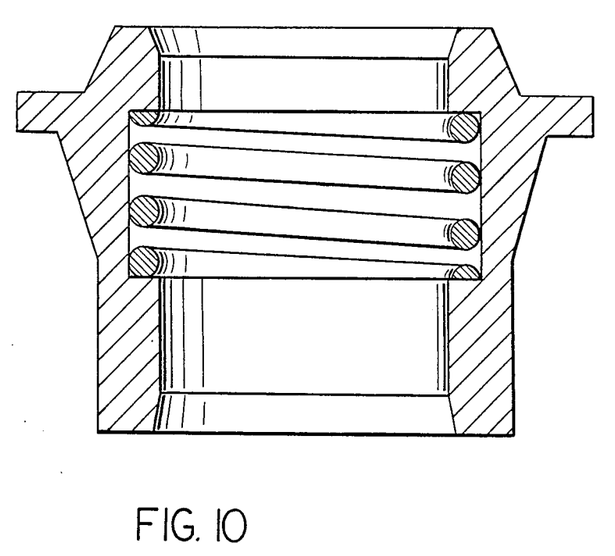

The fastener in accordance with the 2nd and 3rd variation of the invention is shown in FIG. 5 in which a frame 21 has a movable bottom 22 cooperating with a conical ring 23. A non-return valve 24 is screwed into the frame 21 for delivering working medium causing hydraulic pipe end closure. A packing 25 is provided on the internal flat surface of the movable bottom 22, while two packings 26 are situated on the cylindric outer surface, and one packing 27 is placed on the internal cylindric surface of the frame central part. In the frame 21 as well as in the conical ring 23, there are three cut-offs made on each distributed at a constant angular distance. Cut-offs in the frame and in the conical ring are made in fasteners constructed in accordance with the 2nd variation of the invention. In fasteners in accordance with the 3rd variation of the invention, the conical ring consists of two ring segments linked together via a slit ring with a circular cut.

The pipe closing and sealing method in accordance with the invention is presented on the example of a fastener in accordance with the 1st variation of the invention and proceeds as follows: After placing both fasteners on pipe ends, water is fed into each one through non-return valves 6 under increased pressure. Water pressure affecting the movable element 4 through the membrane 7 causes its displacement within the clamping ring 2 and fastening the conical ring on the plastics pipe 8. At the same time, the shifting movable element presses the elastic packing 5 against the head face of the pipe 8 to from a seal. That is followed by filling the pipe with water via the opening 12. At this moment the piston 11 of the pressure compensator 9 is shifted towards the pipe interior to adopt the extreme position shown in FIG. 1. If leaks emerge at element joints threatening with the drop of the value of the fixing force of the fasteners on the pipe, then the piston moving towards the other extreme position would compensate their influence keeping suitable pressure and, as a consequence, the fixing force on the required level.

The presented method of closing and sealing of pipe ends as well as the fasteners for its realization ensure a quick and certain closure and sealing up of a pipe during the whole test process.

What is claimed is:

1. In a seal for a plastic pipe comprising a length of pipe, fasteners on opposite ends of said pipe length, interacting conical surfaces for creating a seal, and means for supplying pressurized fluid to said fasteners, the improvement according to which each of said fasteners comprises a clamping ring having an inner and outer cylindrical surfaces with a cut-out at the bottom of the inner cylindrical surface, a conical ring surrounding the outer cylindrical surface end of the pipe and having a flange extending into said cut-out, a movable element within said clamping ring and extending over the pipe end, and an elastic packing between said movable element and said pipe end, one of said interacting conical surfaces being on the inside of said movable element and the other of said conical surfaces being constituted by the outside of said conical ring, the motion of said movable element being effected by said pressurized fluid supplied to the space between the bottom of said clamping ring and said movable element.

2. A seal according to claim 1, having a flexible membrane in the space between the bottom of said clamping ring and said movable element, and a non-return valve on said clamping ring for supplying the pressurized medium to said space.

3. A seal according to claim 1, having elastic packings between the cylindrical surfaces of said clamping ring and said movable element.

4. A seal according to claim 1, wherein a pressure compensator is incorporated in the fluid supply to the seal, said compensator including a cylinder and a movable piston within said cylinder having first and second sides, said fluid supply being directed to the first side of said piston and the second side of said piston being subjected to the fluid pressure within the pipe.

5. A seal according to claim 4, wherein said first and second sides of the piston have different areas.

* * * * *